United States Patent
Pascaly et al.

(10) Patent No.: US 9,782,728 B2
(45) Date of Patent: Oct. 10, 2017

(54) CERAMIC MEMBRANE HAVING SUPPORT MATERIALS COMPRISING POLYARAMID FIBERS AND METHOD FOR PRODUCING SAID MEMBRANES

(75) Inventors: Matthias Pascaly, Muenster (DE); Rolf-Walter Terwonne, Marl (DE); Christian Hying, Rhede (DE)

(73) Assignee: Evonik Degussa GmbH, Essen (DE)

( * ) Notice: Subject to any disclaimer, the term of this patent is extended or adjusted under 35 U.S.C. 154(b) by 973 days.

(21) Appl. No.: 13/387,750

(22) PCT Filed: Jun. 30, 2010

(86) PCT No.: PCT/EP2010/059286
§ 371 (c)(1),
(2), (4) Date: Jun. 13, 2012

(87) PCT Pub. No.: WO2011/012396
PCT Pub. Date: Feb. 3, 2011

(65) Prior Publication Data
US 2012/0251890 A1    Oct. 4, 2012

(30) Foreign Application Priority Data
Jul. 31, 2009    (DE) .................. 10 2009 028 145

(51) Int. Cl.
*H01M 2/16* (2006.01)
*B32B 3/24* (2006.01)
(Continued)

(52) U.S. Cl.
CPC ......... *B01D 71/02* (2013.01); *B01D 67/0046* (2013.01); *B01D 69/148* (2013.01);
(Continued)

(58) Field of Classification Search
USPC ........................................ 429/246, 247–255
See application file for complete search history.

(56) References Cited

U.S. PATENT DOCUMENTS 4,367,271 A * 1/1983 Hasegawa et al. ............ 429/252
6,937,459 B2 * 8/2005 Yamazaki et al. ............ 361/502
(Continued)

FOREIGN PATENT DOCUMENTS

EP          1 826 842        8/2007
JP       2003268662 (A)      9/2003
(Continued)

OTHER PUBLICATIONS

U.S. Appl. No. 13/387,750, filed Jun. 13, 2012, Pascaly, et al.
(Continued)

*Primary Examiner* — Osei Amponsah
(74) *Attorney, Agent, or Firm* — Oblon, McClelland, Maier & Neustadt, L.L.P.

(57) ABSTRACT

The present invention relates to a membrane comprising a flat, flexible substrate having a plurality of openings and having a porous inorganic coating situated on and in said substrate, the material of the substrate being selected from woven or non-woven, electrically non-conductive fibers, characterized in that the substrate comprises polyaramide fibers that are pure or connected to fibers of the further polymer or at least of one of these further polymers, wherein the fibers of at least one of said further polymers comprise a melting point that is lower than the decomposition point of the polyaramide fibers.

19 Claims, 1 Drawing Sheet

(51) Int. Cl.

| | | |
|---|---|---|
| *B05D 5/12* | (2006.01) | |
| *B05D 3/02* | (2006.01) | |
| *B01D 71/02* | (2006.01) | |
| *B01D 67/00* | (2006.01) | |
| *B01D 69/14* | (2006.01) | |
| *H01M 10/0525* | (2010.01) | |
| *H01M 10/058* | (2010.01) | |

(52) U.S. Cl.
CPC ......... *H01M 2/162* (2013.01); *H01M 2/1666* (2013.01); *H01M 10/058* (2013.01); *H01M 10/0525* (2013.01); *B01D 2323/08* (2013.01); *B01D 2323/12* (2013.01); *B01D 2325/26* (2013.01); *Y10T 428/24331* (2015.01)

(56) References Cited

U.S. PATENT DOCUMENTS

| | | |
|---|---|---|
| 7,655,360 B2 | 2/2010 | Hennige et al. |
| 7,691,528 B2 | 4/2010 | Hennige et al. |
| 7,691,529 B2 | 4/2010 | Hennige et al. |
| 2007/0264577 A1* | 11/2007 | Katayama et al. ........... 429/246 |
| 2008/0190841 A1 | 8/2008 | Pascaly et al. |
| 2010/0024614 A1 | 2/2010 | Rex et al. |
| 2010/0028778 A1 | 2/2010 | Schuch et al. |
| 2012/0251890 A1 | 10/2012 | Pascaly et al. |
| 2012/0308871 A1 | 12/2012 | Pascaly et al. |

FOREIGN PATENT DOCUMENTS

| | | | |
|---|---|---|---|
| JP | 2004-349586 | 12/2004 | |
| JP | 2005-183594 | * 7/2005 | ............. H01M 2/16 |
| JP | 2006188770 (A) | 7/2006 | |
| JP | 2009-32677 | 2/2009 | |
| KR | 1020090075741 | 7/2009 | |
| WO | 2005 038960 | 4/2005 | |
| WO | 2009 060989 | 5/2009 | |
| WO | 2009/060989 A1 | 5/2009 | |

OTHER PUBLICATIONS

U.S. Appl. No. 13/512,950, filed May 31, 2012, Pascaly, et al.
U.S. Appl. No. 13/266,940, filed Oct. 28, 2011, Pascaly et al.
U.S. Appl. No. 13/387,750, filed Jan. 30, 2012, Pascaly et al.
International Search Report issued on Sep. 17, 2010 in PCT/EP10/059286 filed on Jun. 30, 2010.
U.S. Appl. No. 13/980,719, filed Jul. 19, 2013, Beer, et al.
European Examination Report issued Oct. 11, 2016 in co-pending European Patent Application No. 10728225.3-1370, with English translation.
Office Action issued Nov. 21, 2016 in Korean Patent Application No. 10-2012-7002512.
Final Notification of Reasons for Refusal on JP Pat. Appl. No. 2012-522062, with English translation.
Office Action issued Sep. 22, 2014 in JP patent application No. 2012-522062 with English language translation.

* cited by examiner

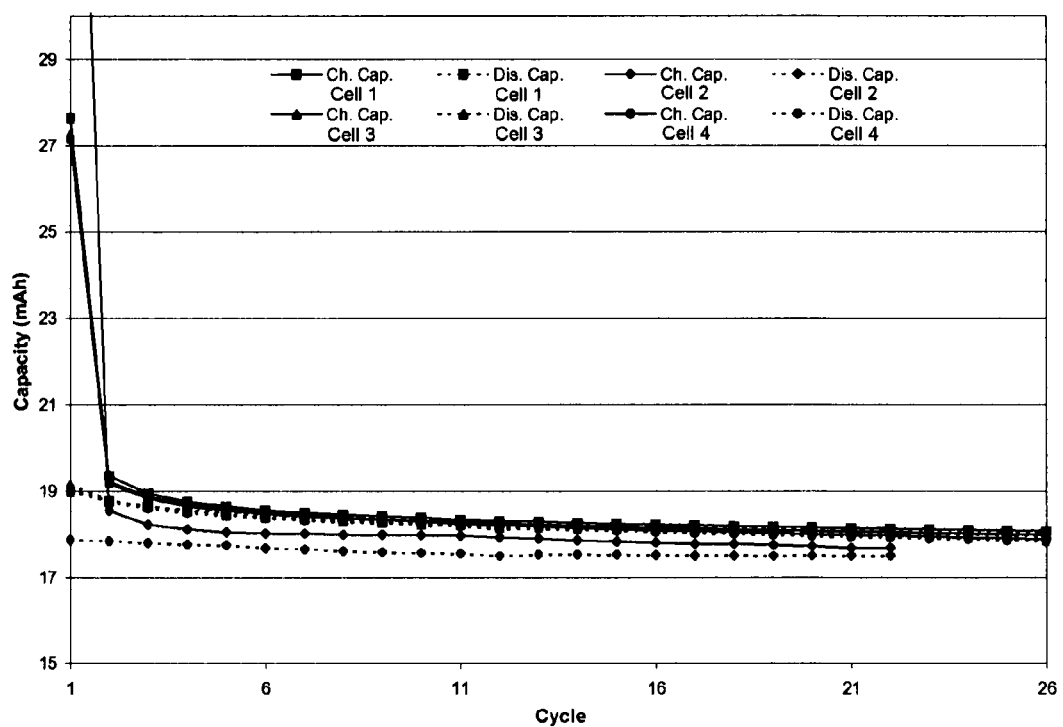

CERAMIC MEMBRANE HAVING SUPPORT MATERIALS COMPRISING POLYARAMID FIBERS AND METHOD FOR PRODUCING SAID MEMBRANES

The present invention relates to a membrane having a sheetlike flexible substrate with a porous inorganic coating present on and in this substrate, the substrate comprising polyaramid fibers which are pure or joined to fibers of at least one further polymer.

Membranes are thin, porous systems having high permeability for a multiplicity of substances, good mechanical strength, and long-term stability with respect to the solvents and chemicals that are used in the application of the membranes, as for example in the electrolyte of a battery.

Membranes presently used are composed predominantly of porous organic polymeric films or of inorganic nonwovens, such as webs of glass or ceramic materials, for example, or else ceramic papers. Membranes used as separators are composed typically of organic materials, as for example of polypropylene or of a polypropylene/polyethylene/polypropylene composite.

Disadvantages of such membranes include their relatively low thermal load-bearing capacity, of well below 150° C., and their low chemical stability. In Li batteries, for example, the polyolefins used are slowly attacked, on contact of the separator with the lithium and/or with the lithiated graphite. In systems with a polymeric electrolyte, therefore, a dense layer of oxidation product is formed, and prevents further destruction of the separator in Li ion batteries. In inorganic systems, this layer does not form, and so destruction is total.

There are attempts to use inorganic composite materials as separators. For instance, in DE 198 38 800 there is an electrical separator which comprises a sheetlike, flexible substrate provided with a multiplicity of openings and having a coating on it, this separator being characterized in that the material of the substrate is selected from metals, alloys, plastics, glass, and carbon fiber or of a combination of such materials, and the coating is a two-dimensionally continuous, porous, electrically nonconducting ceramic coating. The separators, which have a support of electrically conducting material (as indicated in the example), however, have been found not to be suitable for lithium ion cells, since the coating cannot be produced extensively in the thickness described without defects, and, consequently, short circuits occur very readily.

In previous studies (DE 101 42 622) we have been able to show that this is realizable with a material which comprises a sheetlike, flexible substrate provided with a multiplicity of openings and having a coating present on and in this substrate, the material of the substrate being selected from woven or nonwoven, electrically nonconductive fibers of glass or ceramic or a combination of such materials, and the coating being a porous, electrically insulating, ceramic coating, and the resulting separator having a thickness of less than 100 µm and being bendable, having a resistance which is sufficiently low in conjunction with the electrolyte, and nevertheless having a sufficient long-term stability. For a large number of applications, however, the resistance of these separators is still always too high, since the base used is a glass fabric which firstly is too thick and secondly has too low a porosity.

A membrane of this kind is, however, not stable towards strong bases, of the kind used as an electrolyte in NiMe hydride systems and silver-zinc systems and other systems. If these membranes are used as separators for such high-performance systems, they have to be stable in strong bases (40% strength KOH, temperatures in some cases of at least 80° C.). In principle here it is indeed possible to use polymeric membranes based on polyolefins (this is also being done at present), but with the known disadvantage of the low thermal stability. In contrast, inorganic glasslike materials or ceramic materials based on silicon and/or aluminum, with a higher thermal stability, dissolve in the electrolyte.

In the course of the previous optimization of the properties of the separators described in DE 101 42 622, membranes were realized which comprise polymeric substrate materials. In this way, access becomes possible to electrical separators which comprise a sheetlike, flexible substrate provided with a multiplicity of openings and having a coating present on and in this substrate, the material of the substrate being selected from nonwoven, electrically nonconductive fibers of polymers, and the coating being a porous, electrically insulating, ceramic coating. This membrane has a thickness of less than 80 µm, is bendable, exhibits a sufficiently low resistance in conjunction with an electrolyte, and, furthermore, possesses a sufficient long-term stability. The temperature stability of these membranes is the same as that of the porous inorganic coating. Chemical stability with respect to strong bases is obtained by using stable polymers such as polypropylene/polyethylene or polyacrylonitrile nonwoven, for example, and resistant ceramic materials such as $ZrO_2$ and $TiO_2$.

Where polymeric nonwovens are used in ceramically coated membranes, examples being SEPARION separators, described in DE 10 208 277, however, the operating temperature is limited by the melting point of the polymer in the nonwovens. This melting point is about 200° C. In accordance with the present state of the art, higher temperatures are not possible without adverse effect on mechanical properties of the membranes, such as the bendability, for example.

JP 2006/144158 A discloses the easy use of materials having relatively high melting points, but without coating with ceramic material. Aramid fibers are used to produce nonwovens, which find use as separators in lithium ion batteries. The lack of cohesion of the aramid fibers to one another, however, limits the long-term mechanical load-bearing capacity, as a result of vibrations, for example.

WO 2008/018656 and WO 2008/018657 disclose separators based on a base textile which consists of ceramically infiltrated fibers.

JP 2006-188770 A, JP 2004-214066 A, and EP 757 071 B1 each disclose textile separators composed of aramid fibers for lithium ion batteries, but without ceramic fillers.

JP 2006-225499 A discloses a textile separator composed of aramid fibers for lithium ion batteries, which is characterized by a special three-dimensional joining structure of the fibers. The use of ceramic fiber fillers is not described.

Membranes based not only plastics but also on inorganic ceramic are used for water treatment, for example. For instance, WO 2008/70499 describes the use of PTFE membranes. WO 97/39981 describes the use of ceramic membranes.

Described in the literature, in addition to the use of membranes as separators, is the use thereof as proton conductors in fuel cells, as in U.S. Pat. No. 3,368,922

Furthermore, membranes are employed in gas separation, as disclosed for example in US 2007/240565 and WO 2002/068092.

Therefore there continues to be an urgent need for membranes combining thermal stability with mechanical load-bearing capacity.

It was an object of the present invention, therefore, to provide a membrane which is more stable thermally and at the same mechanically than existing material.

The present invention accordingly provides a membrane which comprises a sheetlike, flexible substrate which is provided with a multiplicity of openings and has a porous inorganic coating present on and in this substrate, the material of the substrate being selected from woven or nonwoven, electrically nonconductive fibers, which is characterized in that the substrate comprises polyaramid fibers, which are pure or are joined to fibers of at least one further polymer, the fibers of the further polymer or of at least one of these further polymers having a melting point which is lower than the decomposition point of the polyaramid fibers, or the polyaramid fibers being joined to one another with at least one polymeric binder. This membrane has the advantage of a high temperature stability, reaching well into the range above 200° C. Furthermore, a considerable increase is achieved in the tensile strength and in the puncture resistance of the finished membrane, through use of aramid fibers. This is a key advantage for use of the membrane as a separator in lithium ion batteries, since penetration of the separator is made more difficult.

Likewise provided is a method for producing the membrane of the invention, comprising the steps of:
1) providing a sheetlike, flexible substrate provided with a multiplicity of openings and comprising polyaramid fibers
   which are joined by fibers of at least one further polymer or
   by at least one polymeric binder,
      at least one binder or the fibers of the further polymer or of at least one of these further polymers having a melting point which is lower than the decomposition point of the polyaramid fibers,
2) applying to the substrate a suspension
   which comprises at least one inorganic component comprising a compound of at least one metal, semimetal or mixed metal with at least one element from main groups 3 to 7,
   and a sol,
   and heating at least once, in the course of which
      the suspension is solidified on or in or else on and in the substrate.

The invention combines the advantages of ceramic membranes as described, for example, in specifications DE 10142622, DE 10208277 and DE 10238941, namely the temperature stability, shorting security, and high, controlledly adjusted porosity, with the advantage of the extremely high heat stability and tensile strength afforded by the aramid fibers, since aramids do not have a melting point, and their decomposition point is well above 250° C. Accordingly, the membrane of the invention preserves its integrity in fire. Furthermore, the membrane of the invention has the advantage of high mechanical robustness, as for example when subjected to bending or shearing, despite the fact that the substrate can be very thin. Substrates comprising aramid fibers and combining thinness with mechanical robustness of this kind have not hitherto been realized, since the prior art includes mechanically robust membranes comprising aramid fibers only in conventionally woven or braided form: for example, as membranes of high-end loudspeakers, or of ballistic-resistant apparel, or in instrument enclosures. Since polyaramid fibers for their part have a diameter of 0.5 to 50 μm, braided or woven membranes have correspondingly higher thicknesses of up to 100 μm or more. In the case of the membranes of the invention, in contrast, the polyaramid fibers are joined to one another by means of melted polymers; the mechanical cohesion of the flexible substrate, therefore, is ensured in a new way. As a result of this, very much thinner substrates and hence membranes are realized, which can be employed, for example, as separators in high-performance batteries, examples being lithium ion batteries. Where the membrane of the invention is used as a separator in a battery, the higher thermal load-bearing capacity of this battery means that it can be used in a substantially higher temperature range, from 50 to 300° C., more particularly 50 to 200° C.

Another advantage of the membrane claimed is that it exhibits no contraction at all in comparison to the membranes of the prior art.

The present invention therefore likewise provides for the use of the membrane of the invention as a separator in batteries, as wall lining, as protective and support casing of devices.

Furthermore, therefore, the invention provides a lithium ion battery comprising as separator the membrane of the invention.

The membrane of the invention is elucidated in more detail by way of example below.

The flexible substrate of the membrane of the invention preferably comprises polyaramid fibers having a diameter of 0.5 to 50 μm, more preferably of 0.5 to 20 μm.

It may be advantageous to select, for the diameter of the fibers of the further polymer or polymers, a diameter of 0.5 to 50 μm, more preferably of 0.5 to 20 μm, and very preferably of 0.5 to 10 μm, in order as far as possible to minimize the weight of the membrane. Hence it is possible to construct batteries with a superior power-to-weight ratio, which can be utilized in very many ways.

The substrate, which may be a nonwoven, knitted or woven fabric, preferably has a thickness of 15 to 80 μm, preferably of 25 to 50 μm, and very preferably of 15 to 40 μm. Where the membrane of the invention is used as a separator in a battery, the thickness of the substrate has a great influence on its properties, since not only the flexibility but also the sheet resistance of the electrolyte-impregnated separator is dependent on the thickness of the substrate. Thinner separators permit increased packing density within a battery stack, meaning that a larger amount of energy can be stored in the same volume. It is also possible by this means, furthermore, to increase the limiting current density, by increasing the electrode surface area.

The fibers of the further polymers of the membrane of the invention may preferably be selected from polyethylene terephthalate, abbreviated to PET, polyesters, polycarbonates, polyacrylonitrile, polyimides, polyamides, polyvinylidene fluoride, polyvinylidene fluoride-hexafluoropropylene copolymer, polytetrafluorethylene, polyethylene, polypropylene, or mixtures of these fibers, and/or polyolefin. If only one further polymer is selected, then PET is particularly preferred, having a comparatively high melting point of upward of 200° C. The polymeric binders may be selected from polyurethane, polyvinylidene fluoride, polyvinylidene fluoride-hexafluoropropylene copolymer, polyvinylidene fluoride-PTFE copolymer, butadiene rubber, (meth)acrylate latex, polyvinylpyrrolidone, polyvinyl alcohol or a mixture of these binders.

The fibers of the substrate may preferably be present in a mixing ratio of the polyaramid fibers to the fibers of the further polymer or polymers of 10:1 to 1:10. With particular preference this ratio is 1:1, very preferably 1:1 of the polyaramid fiber to PET fiber.

Where the substrate has two further polymers, the mixing ratio of these further polymers to one another may be in the range of 1:10 to 10:1. In addition to the mechanical optimum of the substrate properties, therefore, substrates are ready which provide an optimum cost/benefit tradeoff.

The substrate of the membrane of the invention preferably has a porosity of 50% to 97%, more preferably of 75% to 90%. The porosity here is defined as the volume of the substrate (100%) minus the volume of the fibers of the substrate; in other words, that proportion of the substrate volume which is not filled out by material. By virtue of the higher melting temperature of the polyaramid fibers, the substrate retains this porosity at higher temperatures than for prior-art membranes.

The substrate of the membrane of the invention may have a melting point of more than 200° C.

The membrane of the invention has a porous, electrically insulating, ceramic coating. It may be advantageous if the coating on and in the substrate comprises an electrically nonconducting oxide of the metals Al, Zr, Si, Sn, Ti and/or Y. This membrane preferably has a porosity of 10% to 70%, more preferably of 20% to 60%, and very preferably of 30% to 50%. The porosity of the membrane refers here to the attainable—i.e., open—pores. It may be determined by means of the known method of mercury porosimetry or may be calculated from the volume and the density of the starting materials employed, on the assumption that only open pores are present. The coating on and in the substrate more preferably comprises an oxide of the metals Al, Zr and/or Si.

The membrane of the invention may have a tensile strength of more than 5 N/cm. This is a considerable improvement on the prior art. At a polyaramid fiber: PET fiber mixing ratio of 1:1 in the substrate, the tensile strength of the membrane of the invention may be 10 N/cm, and 12 N/cm at a ratio of 8:2. Accordingly, in the continuous processing of the fibers, it is possible to achieve greater speeds, as for example in the production of wound cells of lithium ion batteries.

The temperature stability of the membranes of the invention is considerably improved in comparison to the prior art. Contraction of the polyaramid-containing polymeric nonwovens, as with the ceramic composite membranes from the prior art, does not occur. For instance, when PET is used, contractions of up to 10% are measured. This can be avoided by admixing aramid: for example, a membrane of the invention with 50% polyaramid fiber and 50% PET exhibits a contraction of less than 1%.

The membrane of the invention can be bent without damage to a radius of down to 2 mm. If the membrane is used as a separator in batteries, the high tensile strength and the good bendability have the advantage that changes in the geometries of the electrodes during charging and discharging of a battery can be followed by the membrane of the invention without its being damaged. The bendability has the advantage, moreover, that this membrane can be used to produce commercially standardized wound cells. In these cells, the electrodes/separator layers in standardized size are wound spirally with one another and contacted.

The present invention likewise provides a method for producing the membrane of the invention, comprising the steps of:
1) providing a sheetlike, flexible substrate provided with a multiplicity of openings and comprising polyaramid fibers
   which are joined by fibers of at least one further polymer or
   by at least one polymeric binder,
   at least one binder or the fibers of the further polymer or of at least one of these further polymers having a melting point which is lower than the decomposition point of the polyaramid fibers,
2) applying to the substrate a suspension
   which comprises at least one inorganic component comprising a compound of at least one metal, semimetal or mixed metal with at least one element from main groups 3 to 7,
   and a sol,
   and heating at least once, in the course of which
   the suspension is solidified on or in or else on and in the substrate.

In the method of the invention, the fibers of the further polymer or polymers may be selected from polyethylene terephthalate, polyacrylonitrile, polyesters, polyimide, polyamide, polytetrafluoroethylene, or a mixture of these fibers, and/or polyolefin, or the polymeric binder may be selected from polyurethane, polyvinylidene fluoride, polyvinylidene fluoride-hexafluoropropylene copolymer, polyvinylidene fluoride-PTFE copolymer, butadiene rubber, (meth)acrylate latex, polyvinylpyrrolidone, polyvinyl alcohol or a mixture of these binders, and the suspension may comprise at least one oxide of the metals Al, Zr, Si, Ti and/or Y, and/or a sol.

Preferably, the suspension is brought onto and into the substrate by roll coating, print application, press application, injection, roller application, knifecoat application, spread application, dipping, squirting or poured application.

In the method of the invention, the suspension may comprise at least one sol, at least one semimetal oxide sol or at least one mixed metal oxide sol, or a mixture of these sols, and may be prepared by suspending at least one inorganic component in at least one of these sols. The suspension present on and in the substrate may be solidified by heating at 50 to 350° C., preferably 150 to 250° C., on and in the substrate. Heating may take place for 0.5 to 10 minutes at a temperature of 110 to 280° C.

In the applied suspension it is possible to use at least one electrically nonconducting or only very poorly conducting oxide of the metals Al, Zr, Si, Sn, Ti and/or Y, and/or a sol, at least one semimetal oxide sol, at last one mixed metal oxide sol, a mixture of these sols, and/or polyaramid particles.

In a further embodiment of the method of the invention, the suspension may comprise a sol, and at least one oxide of the metals Al, Zr, Si, Ti and/or Y, and polyaramid particles.

Where the suspension comprises polyaramid particles, a separator is obtainable which has a further significantly increased durability, as a separator obtained by means of the method of the invention. The polyaramid particles present in the ceramic coating alongside the oxide particles prevent the propagation of creases or cracks in the ceramic coating of the separator, which occur as a result of careless handling and which may even render prior-art separators unusable.

Resistance to the penetration of foreign bodies or on accidental squeezing of the separator in the course of mechanical processing may also be greater than for conventional ceramic separators in the case of the separators obtainable through use of polyaramid particles. Another advantage of such separators is that their cutting produces significantly less ceramic dust than the cutting of conventional ceramic separators.

It may be advantageous, in the method of the invention, to select the proportion of the polyaramid particles such that the volume fraction of the oxide particles to the polyaramid particles in the separator is from 2:1 to 100:1, preferably 5:1 to 50:1, and more preferably 10:1 to 20:1. In the production of the separator, the volume ratio may be determined from the masses of polyaramid particles and oxide particles that are employed, by calculation of the volume of the individual components from the density and mass of the materials used. It is possible with preference to select an average polyaramid particle size of 0.1 to 30 times, preferably 0.75 to 25 times, more preferably 0.9 to 15 times, and very preferably 1 to 10 times the average particle size of the oxide particles. The average size of the oxide particles is preferably from 0.1 to 10 μm, more preferably from 0.5 to 5 μm, and very preferably from 1 to 3 μm.

The average size of the oxide particles and of the polyaramid particles can be determined by means of low-angle laser light scattering during the production of the separator. In the finished separator, the size of the polyaramid particles and of the oxide particles can be determined by viewing using a scanning electron microscope.

If a polyaramid particle fraction is added to the sol during preparation of the suspension in the method of the invention, a separator is obtained which possesses a continuous porous ceramic coating. Within this coating the polyaramid particles are distributed randomly.

Implementation of the method of the invention leaves the three-dimensional form of the polyaramid particles substantially unaltered. For the implementation of the method claimed, this has the advantage that the pore size of the resulting separator, as for the production of the ceramic separator of the invention, can be controlled by the choice of the inorganic component and of the sol of the suspension and of the subsequent solidification treatment, without the use of polymeric particles. The method, therefore, can be controlled without modifications which a skilled person would expect on account of the polymeric fraction in the slip, it having been found that there is no need to take account of the behavior of the polyaramid particles when solidifying the inventively applied suspension.

The suspension is prepared by suspending at least one inorganic component in at least one of these sols. In step 2) of the method of the invention it is preferred to use a suspension which is electrically insulating in the solidified state.

The sols are obtained by hydrolyzing at least one compound, preferably at least one metal compound, at least one semimetal compound or at least one mixed metal compound. It may also be advantageous to add the compound to be hydrolyzed, prior to the hydrolysis, to alcohol or an acid or to a combination of these liquids. The compound to be hydrolyzed, and which is hydrolyzed, is preferably at least one metal nitrate, metal chloride, metal carbonate or metal alkoxide compound, or at least one semimetal alkoxide compound, more preferably at least one metal alkoxide compound. As metal alkoxide compound or semimetal alkoxide compound it is preferred to hydrolyze an alkoxide compound of the elements Zr, Al, Si, Ti, and Y, or at least one metal nitrate, metal carbonate or metal halide selected from the metal salts of the elements Zr, Al, Si, and Ti, as metal compound. The hydrolysis takes place preferably in the presence of water, water vapor, ice, or an acid or a combination of these compounds.

In one variant embodiment of the method of the invention, hydrolysis of the compounds to be hydrolyzed produces particulate sols. A feature of these particulate sols is that the compounds formed in the sol by hydrolysis are in particulate form. The particulate sols may be prepared as above or as described in WO 99/15262. These sols typically have a very high water content, which is preferably greater than 50% by weight. It may be advantageous to add the compound to be hydrolyzed, prior to the hydrolysis, to alcohol or to an acid or to a combination of these liquids. The hydrolyzed compound may be peptized by treatment with at least one organic or inorganic acid, preferably with an organic or inorganic acid having a strength of from 10% to 60%, more preferably with a mineral acid selected from sulfuric acid, hydrochloric acid, perchloric acid, phosphoric acid, and nitric acid, or with a mixture of these acids. The particulate sols thus prepared can then be used for preparing suspensions.

In another variant embodiment of the method of the invention, polymeric sols are prepared by hydrolysis of the compounds to be hydrolyzed. A feature of these polymeric sols is that the compounds formed in the sol by hydrolysis are present in polymeric form, in other words in a form crosslinked in chain formation over a relatively large area. The polymeric sols typically contain less than 50% by weight, preferably very much less than 20% by weight, of water and/or aqueous acid. In order to arrive at the preferred fraction of water and/or aqueous acid, the hydrolysis is preferably carried out such that the compound to be hydrolyzed is hydrolyzed with 0.5 to 10 times the molar ratio, and preferably with half the molar ratio, of water, water vapor or ice, based on the hydrolyzable group, of the hydrolyzable compound. In the case of compounds which hydrolyze very slowly, such as for tetraethoxysilane, for example, an amount of water of up to 10 times may be used. Compounds which hydrolyze very rapidly, such as zirconium tetraethoxide, may well already form particulate sols under these conditions, which is why the hydrolysis of such compounds is preferably carried out using 0.5 times the amount of water. A hydrolysis with less than the preferred amount of water, water vapor or ice likewise leads to good results. Going below the preferred amount of a half molar ratio by more than 50% though possible, is not very sensible, since below this value the hydrolysis is no longer complete, and coatings based on such sols are not very stable.

To prepare these sols with the desired, very low fraction of water and/or acid in the sol it may be advantageous if the compound to be hydrolyzed is dissolved in an organic solvent, more particularly ethanol, isopropanol, butanol, amyl alcohol, hexane, cyclohexane, ethyl acetate and/or mixtures of these compounds, before the actual hydrolysis is performed. A sol prepared in this way can be used for preparing the suspension of the invention or as an adhesion promoter in a pretreatment step.

Not only the particulate sols but also the polymeric sols can be used as sol in the method of the invention for preparing the suspension. Besides the sols obtainable as just described, it is also possible in principle to use commercial sols, such as zirconium nitrate sol or silica sol, for example. The process of producing separators by applying and solidifying a suspension on a base is known per se from DE 101 42 622 and in similar form from WO 99/15262, but it is not possible to transpose all of the parameters and starting materials to the production of the membrane of the invention. The procedure described in WO 99/15262 in particular cannot be transferred in that form to polymeric nonwoven materials without detractions, since frequently the high-water-content sol systems described therein do not allow thorough wetting of the typically hydrophobic polymeric nonwovens in depth: sol systems of high water content wet the majority of polymeric nonwovens poorly or not at all. It has been found that even very small unwetted sites in the nonwoven material may result in membranes and separators that have defects and are therefore unusable.

Only a sol system or suspension which is adapted to the polymers in terms of its wetting behavior provides complete impregnation of the nonwoven materials and hence allows defect-free coatings to be obtained. With preference, therefore, in the method of the invention, the wetting behavior of the sol or suspension is adapted. This adaptation is aimed at the surface energy of the substrate and is accomplished preferably by the preparation of polymeric sols or suspensions of polymeric sols which comprise one or more alcohols, such as methanol, ethanol or propanol for example, or mixtures which comprise one or more alcohols and also, preferably, aliphatic hydrocarbons. Also possible, however, is the contemplation of other solvent mixtures which may be added to the sol or suspension in order to adapt it in terms of its wetting characteristics to the substrate used.

It has been found that the fundamental change in the sol system and in the resultant suspension leads to a distinct improvement in the adhesion properties of the ceramic components on the and in a polymeric nonwoven material. Such good adhesion strengths are normally not obtainable with particulate sol systems. Preferably, therefore, substrates comprising polymeric fibers are coated by means of suspensions which are based on polymeric sols, or are furnished in an upstream step with an adhesion promoter, preferably a silane, by treatment with a polymeric sol. It is likewise advantageous to pretreat the substrate by exposing it to a plasma or a corona discharge. A procedure of this kind is described in more detail in publication DE 10 2007 005156.

It may be advantageous if the suspension is prepared by suspending, as inorganic component, at least one oxide selected from the oxides of the elements Y, Zr, Al, Si, Sn, and Ti, in a sol. It is preferred to suspend an inorganic component comprising at least one compound selected from aluminum oxide, titanium dioxide, zirconium oxide and/or silicon dioxide. The mass fraction of the suspended component is preferably 0.1 to 500 times, more preferably 1 to 50 times, and very preferably 5 to 25 times that of the sol used.

It may be advantageous if at least one inorganic component which has an average particle size of 1 to 10 000 nm, preferably of 1 to 10 nm, 10 to 100 nm, 100 to 1000 nm or 1000 to 10 000 nm, more preferably of 250 to 1750 nm, and very preferably of 300 to 1250 nm, is suspended in at least one sol. Using inorganic components having an average particle size of 250 to 1250 nm gives the membrane an especially suitable flexiness and porosity.

To improve the adhesion of the inorganic components to polymeric fibers as substrate it may be advantageous to admix the suspensions used with adhesion promoters, such as, for example, organofunctional silanes or else pure oxides such as $ZrO_2$, $TiO_2$, $SiO_2$ or $Al_2O_3$. The admixing of adhesion promoters is preferred in the case of suspensions based on polymeric sols. Adhesion promoters which can be used are more particularly compounds selected from the octyl silanes, the fluorinated octyl silanes, the vinyl silanes, the amine-functionalized silanes and/or the glycidyl-functionalized silanes, such as the Dynasilanes from Degussa, for example. Particularly preferred adhesion promoters for polytetrafluorethylene (PTFE) are, for example, fluorinated octylsilanes; for polyethylene (PE) and polypropylene (PP), vinyl-, methyl-, and octylsilanes, the exclusive use of methylsilanes being nonoptimal; for polyamides and polyamines, amino-functional silanes; for polyacrylates and polyesters, glycidyl-functionalized silanes; and, for polyacrylonitrile it is also possible to employ glycidyl-functionalized silanes. Other adhesion promoters can be used as well, but must be tailored to the respective polymers. The addition of methyltriethoxysilane to the sol system in the coating of polymeric base materials, as described in WO 99/15262, is a comparatively poor solution to the problem of the adhesive strength of ceramic on polymer fibers. Moreover, the drying time of 30 to 120 minutes at 60 to 100° C. for the sol systems described is not sufficient to give hydrolysis-resistant ceramic materials. In other words, on prolonged storage in aqueous media, these materials will dissolve or will be damaged. On the other hand, the temperature treatment of more than 350° C. described in WO 99/15262 would lead to the burning of the polymeric nonwoven used in this case, and hence to the destruction of the membrane. The adhesion promoters, then, must be selected such that the solidification temperature is below the melting, softening or decomposition point of the polymer. Suspensions of the invention contain preferably very much less than 25% by weight, more preferably less than 10% by weight, of compounds which can function as adhesion promoters. An optimum fraction of adhesion promoter is dictated by the coating of the fibers and/or particles with a monomolecular layer of the adhesion promoter. The amount of adhesion promoter required to achieve this, in grams, can be obtained by multiplying the amount of the oxides used and of the fibers (in g) by the specific surface area of the materials (in $m^2\ g^{-1}$), and then dividing the result by the specific space occupancy of the adhesion promoters (in $m^2\ g^{-1}$), the specific space occupancy frequently being situated within the order of magnitude of 300 to 400 $m^2\ g^{-1}$.

The following table contains an illustrative overview of adhesion promoters which can be used, based on organofunctional Si compounds, for typical polymers used as nonwoven material.

| Polymer | Type of organic function | Adhesion promoter |
|---|---|---|
| PAN | Glycidyl | GLYMO |
|  | Methacryloyl | MEMO |
| PA | Amino | AMEO, DAMO |
| PET | Methacryloyl | MEMO |
|  | Vinyl | VTMO, VTEO, VTMOEO |
| PE, PP | Amino | AMEO, AMMO |
|  | Vinyl | VTMO, VTEO, Silfin |
|  | Methacryloyl | MEMO | where:
AMEO = 3-aminopropyltriethoxysilane
DAMO = 2-aminoethyl-3-aminopropyltrimethoxysilane
GLYMO = 3-glycidyloxytrimethoxysilane
MEMO = 3-methacryloyloxypropyltrimethoxysilane
Silfin = vinylsilane + initiator + catalyst
VTEO = vinyltriethoxysilane
VTMO = vinyltrimethoxysilane
VTMOEO = vinyltris(2-methoxyethoxy)silane In accordance with the invention, the suspension present on and in the substrate can be solidified by heating at 50 to 350° C., the polyaramid fibers being joined with the further polymer or polymers or fibers thereof.

In the solidification of prior-art membranes, the effect of the temperature, depending on the level of temperature selected, may cause the prior-art polymer materials to undergo changes in chemical structure, meaning that the polymers are subsequently no longer present in their original state or original modification. For instance, there may be partial carbonization of polyimides, or formation of what are called ladder polymers in the case of polyacrylonitrile, with subsequent partial carbonization. With the membrane of the invention, however, these effects do not occur under the conditions selected in accordance with the invention. There are no unwanted changes in the properties of the base materials, since in such a case substrates are provided which have an appropriate mixing ratio of polyaramid fibers to at least one further polymer as binder and/or fibers thereof.

The heating of the assembly in accordance with the invention may be accomplished by means of heated air, hot air, infrared radiation or by other heating methods according to the prior art.

In one particular embodiment of the method of the invention, the aforementioned adhesion promoters are applied in a preceding step to the substrate, more particularly to the polymeric nonwoven. For this purpose, the adhesion promoters are dissolved in a suitable solvent, such as ethanol, for example. This solution may also include a small amount of water, preferably 0.5 to 10 times the amount, based on the molar amount of the hydrolyzable group, and small amounts of an acid, such as HCl or $HNO_3$, for example, as catalyst for the hydrolysis and condensation of the Si—OR groups. The known techniques, such as spray application, print application, press application, injection, roller application, knifecoat application, spread application, dipping, squirting or poured application, for example, are used to apply this solution to the substrate, and the adhesion promoter is fixed on the substrate by a temperature treatment at 50 to not more than 350° C. With this variant embodiment of the method of the invention, it is only after the application of the adhesion promoter that the suspension is applied and solidified.

In another variant embodiment of the method of the invention, adhesion-promoting layers are applied in a pretreatment step in which a polymeric sol is applied and solidified. The application and solidification of the polymeric sol takes place preferably in the same way as the application and solidification of the suspensions.

A typical polymeric sol for a pretreatment constitutes for instance a 2% to 10% by weight alcoholic solution of a metal alkoxide (e.g., titanium ethoxide or zirconium propoxide), which may further comprise 0.5 to 10 mol fractions of water and also small amounts of an acid as catalyst. After such a sol has been applied to the substrate, the substrates, preferably polymeric nonwovens, are treated at a temperature of not more than 350° C. This causes a dense film of a metal oxide to form around the substrate fibers, thus enabling infiltration of the substrate with a suspension or slip based on a commercial zirconium nitrate sol or silica sol without difficulties in wetting.

Since polymeric sols more readily form dense films than do particulate sols, and since, moreover, the particulate sols always possess relatively large amounts of water in the pore microstructure of the interstitial volumes, it is easier to dry polymeric sols than particulate sols. Nevertheless, the membranes have to be dried at temperatures of more than 150° C. in order for the ceramic material to acquire sufficient strength of adhesion to the substrate. Particularly good adhesive strengths are obtainable at a temperature of at least 200° C., and especially good strengths at a temperature of at least 250° C.

Both modes of application of an adhesion promoter prior to application of the suspension itself may enhance the adhesion behavior of the substrates particularly with respect to aqueous, particulate sols, and so, in particular, substrates pretreated in these ways may be coated inventively with suspensions based on commercial sols, such as zirconium nitrate sol or silica sol for example. This procedure of applying an adhesion promoter also means, however, that the production method of the membrane of the invention has to be expanded to include an intervening or preliminary treatment step. This is feasible, albeit at greater cost and inconvenience, than the use of adapted sols to which adhesion promoters have been admixed, but also has the advantage that better results are obtained when using suspensions based on commercial sols.

The method of the invention can be carried out, for example, by unwinding the substrate from a roll, passing it at a speed of 1 m/h to 2 m/s, preferably at a speed of 0.5 m/min to 20 m/min, and very preferably at a speed of 1 m/min to 5 m/min, through at least one apparatus which brings the suspension onto and into the support, such as a roller, for example, and through at least one further apparatus which allows the suspension to be solidified on and in the support by heating, such as an electrically heated furnace, for example, and winding up the thus-produced separator on a second roll. In this way it is possible to produce the separator of the invention in a continuous process. The pretreatment steps as well can be carried out in a continuous process, with the stated parameters being observed.

The membrane of the invention is a suitable separator for primary and secondary (rechargeable) lithium batteries, for nickel metal hydride, nickel-cadmium, silver-zinc, and zinc-air batteries. The suitabilities of this membrane include its usefulness as a separator in batteries which utilize the $Li/LiAlCl_4 \times SO_2/LiCoO_2$ system. In all other battery systems not specified here, however, the membrane of the invention can also be employed. It is particularly suitable for use in battery systems with comparatively high permitted operating temperatures.

The membranes of the invention are also highly suitable for use as separators in batteries which are to have a fast charging cycle. By virtue of the high temperature stability of the membrane of the invention as separator, a battery equipped with this separator is not so temperature-sensitive and is therefore able better to tolerate the temperature increase due to the rapid charging without adverse changes to the separator and without damage to the battery. These batteries consequently have a much faster charging cycle. This is a distinct advantage when batteries equipped in this way are used in electric vehicles, since the vehicles no longer have to be charged for 12 hours or even longer, and instead charging is feasible within much shorter time periods.

By adaptation of the starting materials or by aftertreatment of the ceramic layer it is possible to accommodate a variety of chemical and technical requirements.

Thus, for example, by aftertreatment or by reaction with corresponding chemical groups, with which the skilled person is familiar, a hydrophobic or hydrophilic coating can be produced. This may be done, for example, using organo-trialkoxy compounds of silicon. These compounds can be applied either together with the ceramic material to the substrate, or else may be applied subsequent to the production of the separator.

Selecting particularly alkali-resistant starting materials allows the membrane of the invention to be optimized as a separator for systems with strongly basic electrolytes. In this case, zirconium oxide or titanium dioxide is used instead of aluminum oxide or silicon dioxide as inorganic component. No modifications are required to the substrate.

The present invention is described in more detail by the examples which follow.

EXAMPLE 1: PRODUCTION OF A MEMBRANE OF THE INVENTION

To 160 g of ethanol were initially added 15 g of a 5% strength by weight aqueous HCl solution, 10 g of tetraethoxysilane, 2.5 g of methyltriethoxysilane, and 7.5 g of Dynasilan GLYMO (manufacturer of all Dynasilanes: Evonik AG). This sol, which was initially stirred for a number of hours, was then used to suspend 125 g each of Martoxid MZS-1 and Martoxid MZS-3 aluminum oxides (manufacturer of both aluminum oxides: Martinswerke). This slip was homogenized for at least a further 24 hours with a magnetic stirrer, during which the stirred vessel had to be covered so that there was no loss of solvent.

A nonwoven composed of a polyaramid/PET fiber blend, with a ratio of 50% polyaramid fiber (Kevlar, manufacturers include DuPont) and 50% PET (manufacturer Advansa, Dacron type), with a thickness of about 30 µm and a basis weight of about 20 g/m$^2$, was coated with the above slip in a continuous roll application process (belt speed about 8 m/h, T=200° C.). In this roll application process, the slip was applied to the nonwoven using a roller which moved in the opposite direction to the belt direction (direction of movement of the nonwoven). The nonwoven subsequently passed through an oven which had a temperature of 200° C. In the following example, the same technique and arrangement were used. The end result obtained was a membrane having an average pore size of 450 nm.

EXAMPLE 2: PRODUCTION OF A MEMBRANE OF THE INVENTION

To 160 g of ethanol were added first of all 15 g of a 5% strength by weight aqueous HCl solution, 10 g of tetraethoxysilane, 2.5 g of methyltriethoxysilane, and 7.5 g of Dynasilan GLYMO. This sol, which was initially stirred for a number of hours, was then used to suspend 280 g of Alcoa CT 1200 SG aluminum oxide.

This slip was homogenized for at least a further 24 hours with a magnetic stirrer, during which it was necessary to cover the stirred vessel so that there was no loss of solvent.

A polyaramid fiber/PET nonwoven (ratio 80% polyaramid fiber (manufacturer, for example, DuPont, Kevlar type) and 20% PET (manufacturer Advansa, Dacron type) having a thickness of about 100 µm and a basis weight of 22 g/m$^2$ was coated with the above slip in a continuous roll application process (belt speed about 8 m/h, T=250° C.). The end result obtained was a membrane having an average pore size of 240 nm.

EXAMPLE 3: LI ION BATTERY WITH THE MEMBRANE OF THE INVENTION AS SEPARATOR

A membrane produced as in example 1 was installed in an Li ion cell consisting of a positive mass of LiCoO$_2$, a negative mass consisting of graphite, and an electrolyte composed of LiPF$_6$ in ethylene carbonate/dimethyl carbonate [LiCoO2 (36.3 mg), active mass 86%/S-450-PET_2, EC/DMC 1:1, 1M LiPF6/graphite (17.0 mg), active mass 90%].

Four specimen cells were constructed, and the charging capacity achieved was recorded as a function of the charge and discharge cycles. The charge and discharge capacities against the cycle run are shown as a graph in FIG. 1 for the various specimen cells. In FIG. 1, Ch. Cap. denotes charging capacity and Dis. Cap. denotes discharging capacity.

For all four cells, no drop in capacity was found over the measured time period, and the charging and discharging capacities were virtually identical. Even after 26 cycles, no drop in battery performance was found.

EXAMPLE 4: INVESTIGATION OF TEMPERATURE STABILITY

To investigate the contraction behavior, cut-to-size sections of the ceramic composite membranes and of the polyaramid fiber nonwovens were exposed to elevated temperatures. In the course of this exposure it was found that contraction was observed only for the comparative material (PET nonwoven). For the remaining materials, the contraction was below 1%, as shown in Table 1.

TABLE 1

| | Contraction at 100° C. | Contraction at 200° C. |
|---|---|---|
| PET nonwoven | 3% | 10% |
| Polyaramid fiber nonwoven | <1% | <1% |
| Polyaramid fiber/PET nonwoven | <1% | <1% |
| Ceramic composite membrane with PET nonwoven, described in WO 2008/038960 | 3% | 5% |
| Membrane of the invention with polyaramid fiber/PET nonwoven | <1% | <1% |

Moreover, no change in the color of the material was found to accompany increase in temperature. Even when the membrane of the invention was exposed to flames, it retained its integrity in the form of the test component.

The invention claimed is:

1. A membrane, comprising:
    a sheetlike, flexible, woven or nonwoven substrate comprising electrically nonconductive fibers, which is provided with a multiplicity of openings; and
    a porous inorganic coating on and inside the substrate,
    wherein the electrically nonconductive fibers comprise
    (i) polyaramid fibers melted to fibers of a further polymer having a melting point lower than the decomposition point of the polyaramid fibers, or
    (ii) polyaramid fibers melted to one another with a polymeric binder.

2. The membrane of claim 1, wherein the further polymer fibers are at least one selected from the group consisting of polyethylene terephthalate, a polyester, a polycarbonate, polyacrylonitrile, a polyimide, a polyamide, polyvinylidene fluoride, polyvinylidene fluoride-hexafluoropropylene copolymer, polytetrafluoroethylene, polyethylene, polypropylene, and polyolefin, and
    the polymeric binder is at least one selected from the group consisting of polyurethane, polyvinylidene fluoride, polyvinylidene fluoride-hexafluoropropylene copolymer, polyvinylidene fluoride-PTFE copolymer, butadiene rubber, (meth)acrylate latex, polyvinylpyrrolidone, and polyvinyl alcohol.

3. The membrane of claim 1, wherein the polyaramid fibers are melted to further polymer polymer fibers and a mixing ratio of the polyaramid fibers to the further polymer fibers is in a range of 10:1 to 1:10.

4. The membrane of claim 1, wherein the substrate has a porosity of 50 to 97%.

5. The membrane of claim 1, wherein the substrate has a melting point of more than 200° C.

6. The membrane of claim 1, having a tensile strength of more than 5 N/cm.

7. A method for producing the membrane of claim 1, the method comprising:
    (I) applying a suspension comprising an inorganic component comprising a compound comprising a metal, a semimetal, or a mixed metal and a main group element selected from the group consisting of a group 3 to group 7 element, and a sol, to a sheetlike, flexible substrate provided with a multiplicity of openings and comprising (i) polyaramid fibers which are joined to further polymer fibers having a melting point lower than the decomposition point of the polyaramid fibers or (ii) polyaramid fibers joined to one another with a polymeric binder; and (II) heating the substrate to a temperature of between 200 to 350° C., to obtain a solidified suspension on the substrate, inside the substrate, or both.

8. The method of claim 7, wherein the further polymer fibers are at least one selected from the group consisting of polyethylene terephthalate, polyacrylonitrile, polyester, polyimide, polyamide, polytetrafluoroethylene, and polyolefin, the polymeric binder is at least one selected from the group consisting of polyurethane, polyvinylidene fluoride, polyvinylidene fluoride-hexafluoropropylene copolymer, polyvinylidene fluoride-PTFE copolymer, butadiene rubber, (meth)acrylate latex, polyvinylpyrrolidone, polyvinyl alcohol, and the suspension comprises at least one selected from the group consisting of a sol, polyaramid particles, and at least one oxide of a metal selected from the group consisting of Al, Zr, Si, Ti, and Y.

9. The method of claim 7, wherein the suspension comprises a sol, polyaramid particles, and at least one oxide of a metal selected from the group consisting of Al, Zr, Si, Ti, and Y.

10. The method of claim 7, wherein the applying (I) is carried out by roll coating, printing, pressing, injecting, rolling, knifecoating, spreading, dipping, squirting, or pouring.

11. The membrane of claim 1, wherein the membrane is suitable for use as a separator in a battery, a wall lining, or a protective and support device casing.

12. A lithium ion battery, comprising:
the membrane of claim 1, wherein the membrane is a separator.

13. The membrane of claim 1, wherein the polyaramid fibers have a diameter in a range of 0.5 to 50 µm.

14. The membrane of claim 1, wherein the polyaramid fibers have a diameter in a range of 0.5 to 20 µm.

15. The membrane of claim 3, wherein the further fibers are polyethylene terephthalate fibers.

16. The membrane of claim 15, wherein a mixing ratio of the polyaramid fibers and the polyethylene terephthalate fibers is 1:1.

17. The membrane of claim 4, wherein the substrate has a porosity of 75 to 90%.

18. The membrane of claim 1, wherein the electrically nonconductive fibers comprise
(i) polyaramid fibers melted to fibers of a further polymer having a melting point lower than the decomposition point of the polyaramid fibers.

19. The membrane of claim 1, wherein the electrically nonconductive fibers comprise
(ii) polyaramid fibers melted to one another with a polymeric binder.

* * * * *